(12) United States Patent
Wohlers et al.

(10) Patent No.: US 7,249,053 B2
(45) Date of Patent: Jul. 24, 2007

(54) PRESENTATION OF MESSAGES TO END-USERS IN A COMPUTER NETWORK

(75) Inventors: Robert W. Wohlers, Castro Valley, CA (US); Scott G. Eagle, Menlo Park, CA (US); Lee E. Amber, Boulder Creek, CA (US); Marc E. Silverberg, Oakland, CA (US)

(73) Assignee: Claria Corporation, Redwood City, CA (US)

( * ) Notice: Subject to any disclaimer, the term of this patent is extended or adjusted under 35 U.S.C. 154(b) by 0 days.

(21) Appl. No.: 10/462,578

(22) Filed: Jun. 16, 2003

(65) Prior Publication Data

US 2004/0254834 A1 Dec. 16, 2004

(51) Int. Cl.
*G06Q 30/00* (2006.01)

(52) U.S. Cl. ........................................ 705/14
(58) Field of Classification Search .................... 705/14
See application file for complete search history.

(56) References Cited

U.S. PATENT DOCUMENTS

| | | | |
|---|---|---|---|
| 5,446,919 A | 8/1995 | Wilkins | |
| 5,794,259 A | 8/1998 | Kikinis | |
| 6,026,368 A | 2/2000 | Brown et al. | |
| 6,141,010 A | 10/2000 | Hoyle | |
| 6,295,061 B1 | 9/2001 | Park et al. | |
| 6,314,451 B1 * | 11/2001 | Landsman et al. | 709/203 |
| 6,601,041 B1 | 7/2003 | Brown et al. | |
| 2002/0094868 A1 * | 7/2002 | Tuck et al. | 463/42 |
| 2002/0154163 A1 | 10/2002 | Melchner | |
| 2002/0194151 A1 | 12/2002 | Fenton et al. | |
| 2005/0091111 A1 * | 4/2005 | Green et al. | 705/14 |

FOREIGN PATENT DOCUMENTS

| | | |
|---|---|---|
| JP | 2002 2073545 A * | 3/2002 |
| WO | WO 99 38321 A1 * | 7/1999 |
| WO | WO 99/55066 | 10/1999 |

OTHER PUBLICATIONS

Heller, Laura, "Target gets mod in Manhattan", DSNRetailing Today, v40 n16, Aug. 20, 2001: 2, 37.*
Ready, Kevin et al., "Plug-n-Play Java Script" (Indianapolis, IN: New Riders Publishing, 1996): 19-22, 39, 40 and 43-45.*

(Continued)

*Primary Examiner*—Donald L. Champagne
(74) *Attorney, Agent, or Firm*—Joseph E. Root; Haynes Beffel & Wolfeld

(57) ABSTRACT

In one embodiment, a first message and a second message are sequentially displayed in the same presentation vehicle. Initially, the first message may be displayed in the presentation vehicle. The second message may replace the first message in the presentation vehicle if the presentation vehicle is about to be closed. Sequentially displaying two messages in the same presentation vehicle minimizes the number of presentation vehicles on a computer screen and provides at least two chances to attract an end-user's attention. It provides end-users with another alternative choice without taking up any more display space. When employed to display advertisements, for example, this provides more value to end-users and enables more advertisers to reach their target audience.

17 Claims, 5 Drawing Sheets

OTHER PUBLICATIONS

Definition of "close button", Microsoft Press Computer Dictionary, 3rd ed. (Redmond WA: Microsoft Press, 1997).*

Google search for "define: close button", Mar. 2, 2007.*

Claria—Company Information—Corporate Review, webpage [online], retrieved on Mar. 3, 2005, retrieved from the internet: <URL:http://www.claria.com/companyinfo.html>.

* cited by examiner

PRESENTATION OF MESSAGES TO END-USERS IN A COMPUTER NETWORK

BACKGROUND OF THE INVENTION

1. Field of the Invention

The present invention relates generally to computer systems, and more particularly but not exclusively to techniques for presenting messages to end-users in a computer network.

2. Description of the Background Art

Advertising serves the same purpose on the Internet as in radio and television. In radio and television, advertising allows listeners and viewers to have free access to programming. Similarly, on the Internet, advertising provides end-users free access to services and web sites. For example, a web site may display advertising along with web pages. Revenue from the advertising not only generates profits, but also pays for the maintenance of the web site. As another example, a software developer may provide free utility programs in return for the right to deliver advertising to end-users. In essence, revenue from the advertising helps defray the cost of developing and maintaining the utility programs.

On the Internet, an advertisement may be displayed in a variety of presentation vehicles. Examples of presentation vehicles include pop-ups, pop-unders, banners, web browser windows, and the like. Typically, a single presentation vehicle is employed to display a single advertisement. For example, one advertisement may be displayed in one pop-up, while another advertisement may be displayed in another pop-up. An end-user may click on an advertisement to learn more about the product being advertised. Clicking on an advertisement may result in the end-user being directed to a web site of the product advertiser. An end-user may also choose to close a presentation vehicle containing an advertisement if she is not interested in it. For example, an end-user may choose to close a pop-up by clicking on the pop-up's close button.

SUMMARY

In one embodiment, a first message and a second message are sequentially displayed in the same presentation vehicle. Initially, the first message may be displayed in the presentation vehicle. The second message may replace the first message in the presentation vehicle if the presentation vehicle is about to be closed. Sequentially displaying two messages in the same presentation vehicle minimizes the number of presentation vehicles on a computer screen and provides at least two chances to attract an end-user's attention. It provides end-users with another alternative choice without taking up any more display space. When employed to display advertisements, for example, this provides more value to end-users and enables more advertisers to reach their target audience.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods to provide a thorough understanding of embodiments of the invention. Persons of ordinary skill in the art will recognize, however, that the invention can be practiced without one or more of the specific details. In other instances, well-known details are not shown or described to avoid obscuring aspects of the invention. For example, the mechanics of monitoring an end-user's browsing activity, such as determining where an end-user is navigating to, what an end-user is typing on a web page, when an end-user clicks on a button, tracking a cursor on a computer screen, and the like, is, in general, known in the art and not further described here.

The invention is described in the context of advertisement delivery over the Internet. It should be understood, however, that the invention is not so limited and may be generally used in other applications where messages are displayed for viewing by end-users. Furthermore, it is to be noted that as used in the present disclosure, "advertising" or "advertisement" includes any type of message provided to end-users for the purpose of getting their attention on something. Typically but not necessarily, an advertisement is with regards to products, which may be goods or services. However, an advertisement may also be related to an election campaign, a cause (e.g., "save the planet"), an announcement, etc.

Figure 1:
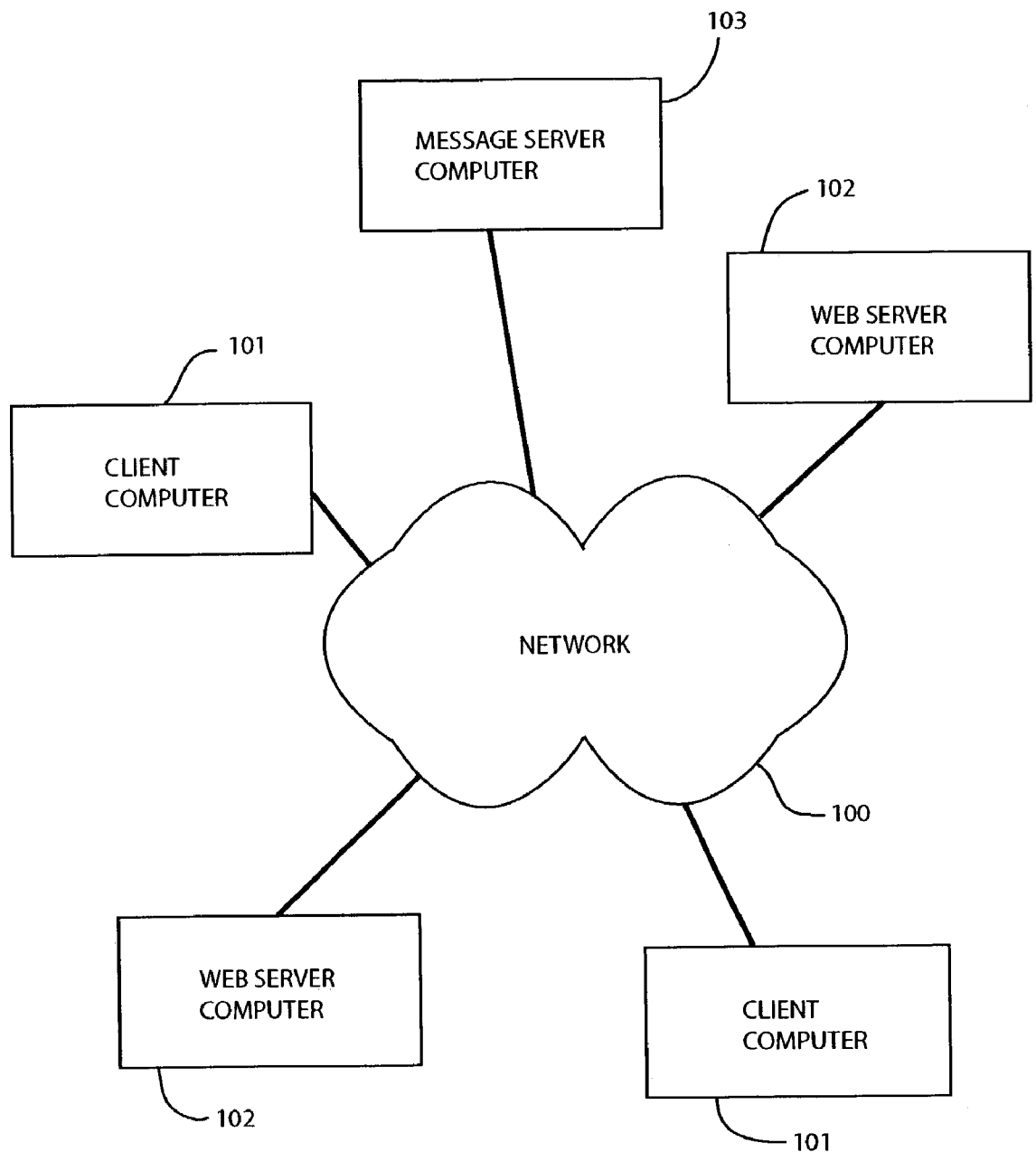
FIG. 1 schematically shows a computer network in accordance with an embodiment of the present invention.

Referring now to FIG. 1, there is shown a schematic diagram of a computer network 100 in accordance with an embodiment of the present invention. Network 100 may include one or more client computers 101, one or more web server computers 102, one or more message server computers 103, and other computers not shown. Intermediate nodes such as gateways, routers, bridges, Internet service provider networks, public-switched telephone networks, proxy servers, firewalls, etc. are not shown for clarity. In the example of FIG. 1, network 100 includes the Internet; however, other types of computer networks may also be used. Computers may be coupled to network 100 using any type of connection without detracting from the merits of the present invention.

A client computer 101 may be a personal computer running the Microsoft Windows™ operating system, for example. An end-user may employ a suitably equipped client computer 101 to get on network 100 and access computers coupled thereto. For example, an end-user may employ a client computer 101 to access web pages from a web server computer 102. It is to be noted that the term "computer" includes any type of information processing device including personal digital assistants, digital telephones, wireless terminals, etc.

A web server computer 102 may be a web site containing information designed to attract end-users surfing on the Internet. A web server computer 102 may include advertisements, downloadable computer programs, and products available for online purchase. A web server computer 102 may also be an ad server for delivering advertisements to a client computer 101.

A message server computer 103 may include the functionalities of a web server computer 102. Additionally, in one embodiment, a message server computer 103 may include messages and presentation vehicles for delivery to a client computer 101. The messages may comprise advertisements, for example. A message server computer 103 may also include downloadable computer programs and files for supporting, updating, or maintaining components on a client computer 101. An example message server computer is disclosed in commonly-assigned U.S. application Ser. No. 10/152,204, entitled "Method And Apparatus For Displaying Messages In Computer Systems," filed on May 21, 2002 by Scott G. Eagle, David L. Goulden, Anthony G. Martin, and Eugene A. Veteska, which is incorporated herein by reference in its entirety. It is to be noted that the present invention does not have to be employed with particular message servers.

Web server computers 102 and message server computers 103 are typically, but not necessarily, server computers such as those available from Sun Microsystems, Hewlett-Packard, International Business Machines, etc. A client computer 101 may communicate with a web server computer 102 or a message server computer 103 using client-server protocol. Client-server computing is well known in the art and will not be further described here.

Figure 2:
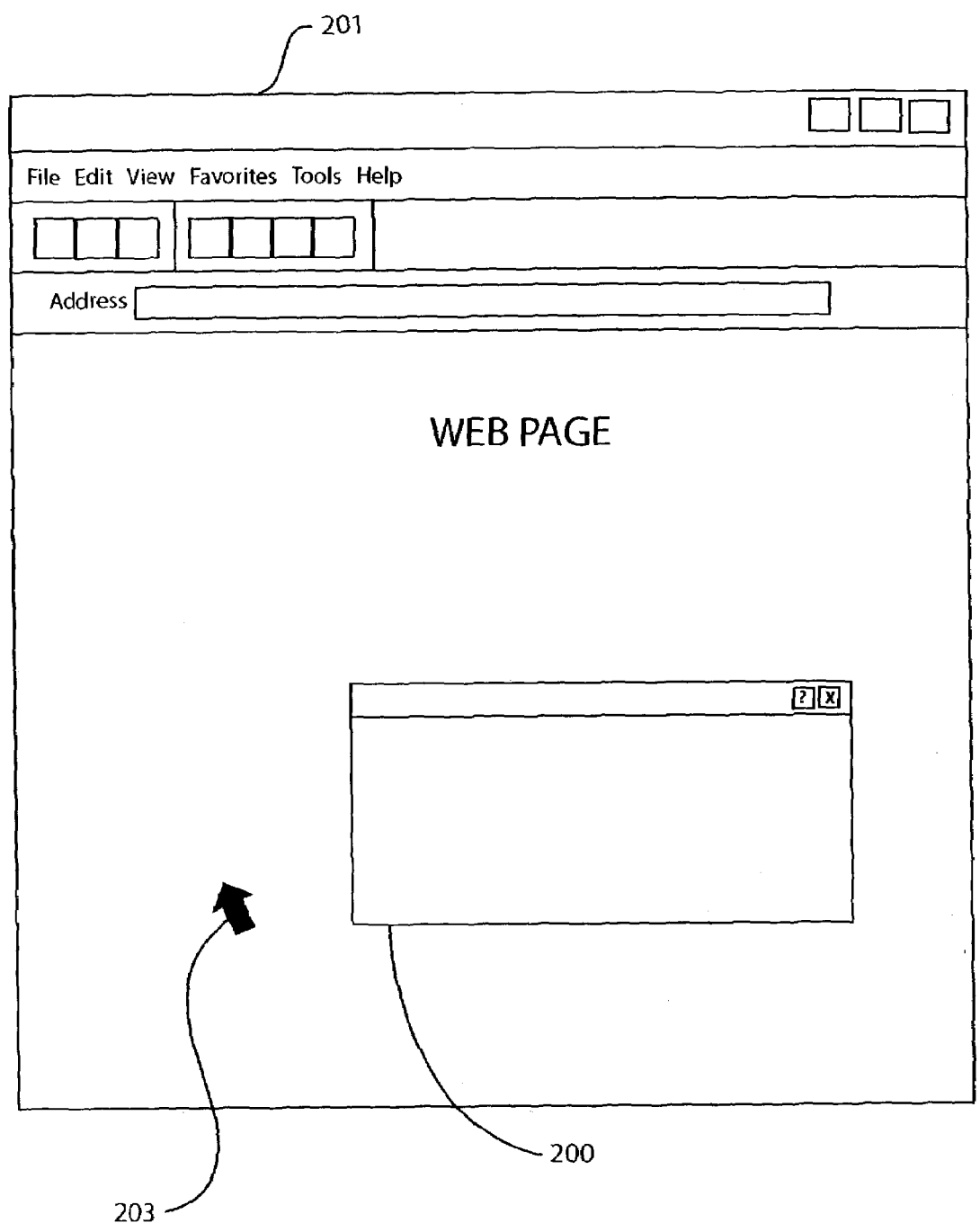
FIG. 2 shows a presentation vehicle in accordance with an embodiment of the present invention.

FIG. 2 shows a presentation vehicle 200 in accordance with an embodiment of the present invention. Presentation vehicle 200 may display messages received from a server computer, such as a web server computer 102, a message server computer 103, or an ad server. In the example of FIG. 2, presentation vehicle 200 is depicted as a pop-up window over a web browser 201 (e.g., Microsoft Internet Explorer™ web browser). In light of the present disclosure, it will be appreciated that presentation vehicle 200 may also be a slider, a pop-under, or other types of closeable presentation vehicle. Presentation vehicle 200 may be displayed separately from web browser 201 as shown in FIG. 2, or displayed in web browser 201. For example, presentation vehicle 200 may be part of a web page being displayed in web browser 201. Also shown in FIG. 2 is a cursor 203, which may be a cursor of a pointing device (e.g., mouse, trackball, joystick). Web browser 201, cursor 203, and presentation vehicle 200 may be displayed on a computer screen of a client computer 101.

Figure 3A:
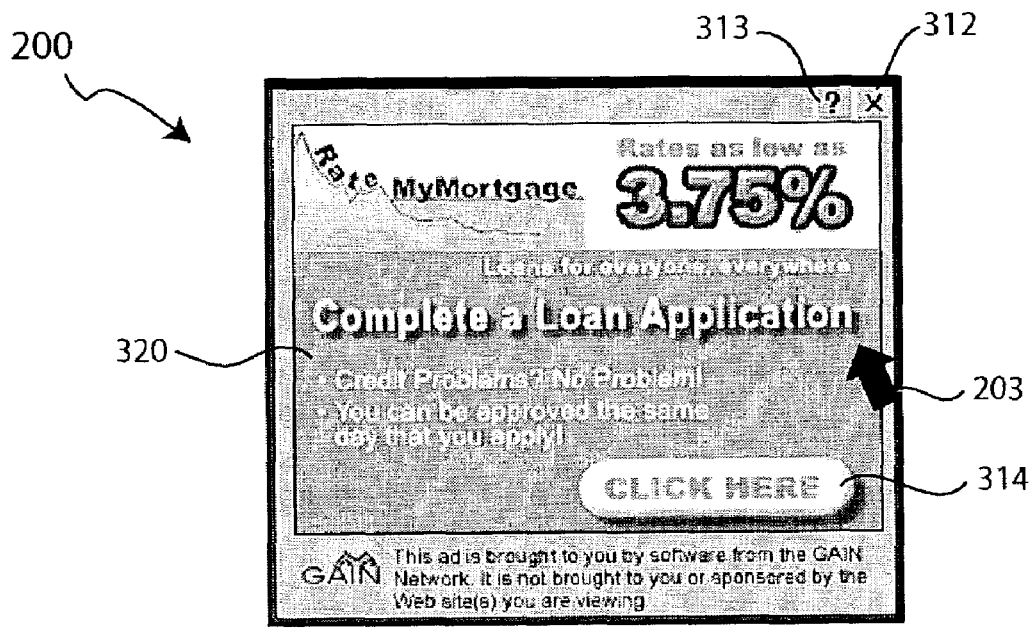
FIGS. 3(a), 3(b), and 3(c) show further details of the presentation vehicle of FIG. 2.
Figure 3B:
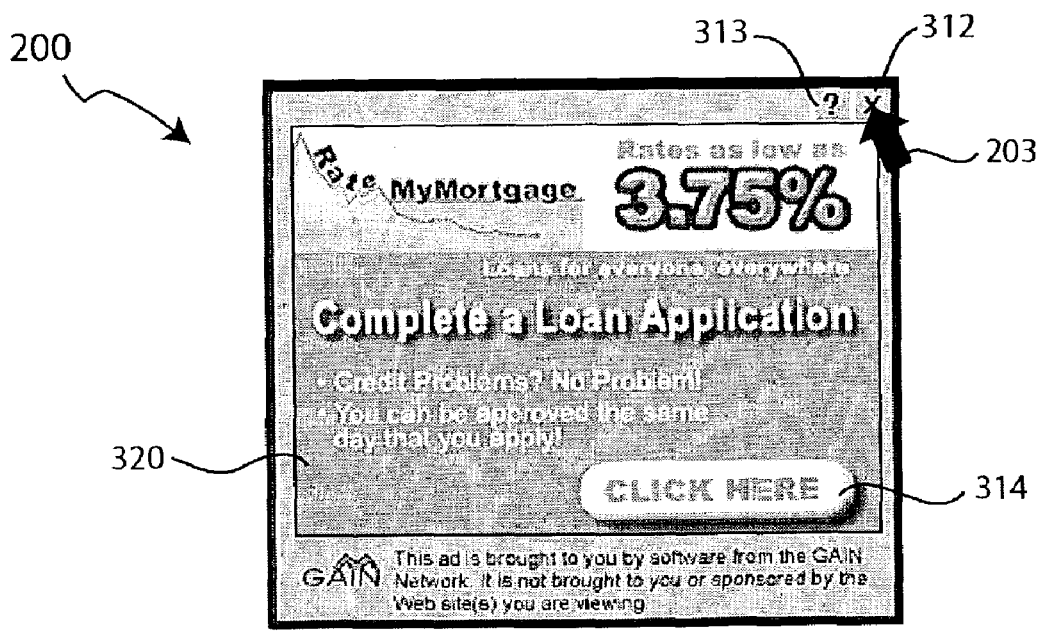
Figure 3C:
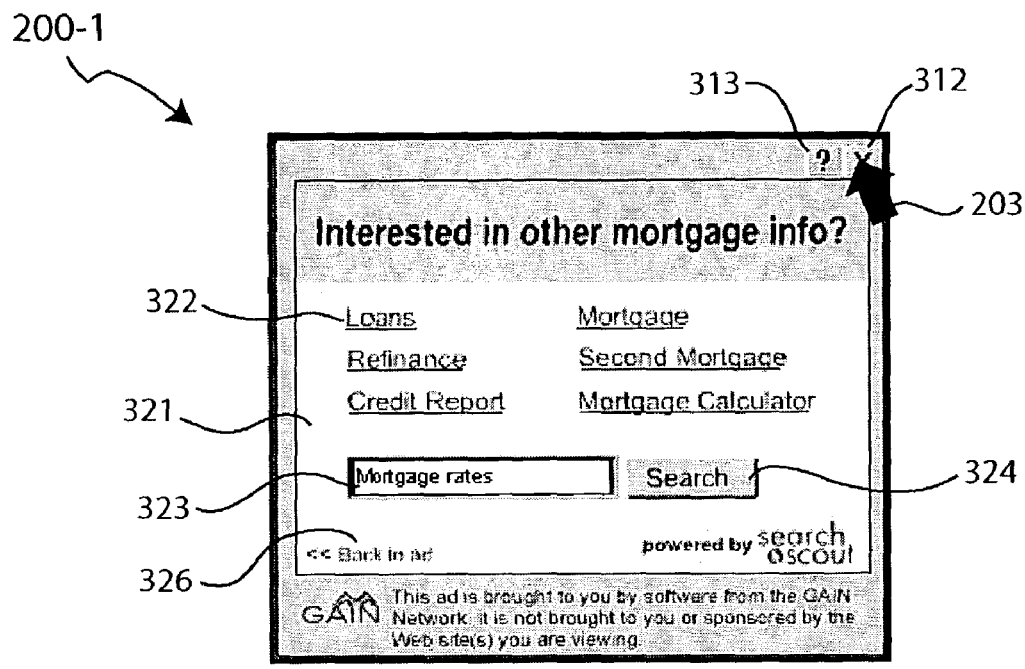

FIGS. 3(a), 3(b), and 3(c) show further details of presentation vehicle 200 in accordance with an embodiment of the present invention. In one embodiment, presentation vehicle 200 is implemented in computer-readable program code (i.e., in software) readable using Macromedia Flash Player 5 reader and later versions. Macromedia Flash Player reader is commercially available from Macromedia, Inc. of San Francisco, Calif.

In the example of FIG. 3(a), presentation vehicle 200 is a window displaying a message 320. In one embodiment, message 320 comprises an advertisement. Message 320 includes a forward button 314 that when clicked on will open another window (not shown) containing more information about the advertisement. In the example of FIG. 3(a), clicking on forward button 314 will result in the end-user receiving another window containing more information about the loan offering being advertised.

As shown in FIG. 3(a), presentation vehicle 200 may have a close button 312 and an information button 313. Clicking on information button 313 may open another window displaying help information, for example. In one embodiment, clicking on close button 312 closes presentation vehicle 200. For example, using a mouse to point cursor 203 over close button 312 as shown in FIG. 3(b), and then clicking a button of the mouse will result in presentation vehicle 200 being closed. Presentation vehicle 200 is "closed" when it is removed from the computer screen, such as when it is minimized, removed from the display buffer of the client computer, or not viewable by the end-user.

In accordance with an embodiment of the present invention, message 320 is replaced with another message when presentation vehicle 200 is about to be closed. For example, the advertisement currently displayed in presentation vehicle 200 may be replaced with another advertisement when the end-user performs an action that indicates a desire to close the presentation vehicle. This allows a single presentation vehicle 200 to sequentially present two advertisements, thereby minimizing the amount of presentation vehicles displayed on a computer screen and increasing the amount of advertisements displayed to the end-user. In addition, sequentially displaying two advertisements in the same window provides two chances to attract an end-user's attention.

In one embodiment, message 320 is replaced with another message when cursor 203 is over close button 312. FIG. 3(c) illustrates the replacement of message 320 (see FIG. 3(b)) with message 321 when cursor 203 is pointed over close button 312. In FIG. 3(c), presentation vehicle 200 is relabeled as "200-1" to indicate that message 321 has replaced message 320. That is, presentation vehicle 200-1 is the same window as presentation vehicle 200 except for the new message.

In the example of FIG. 3(c), message 321 comprises an advertisement related to that in message 320. More specifically, messages 320 and 321 both comprise an advertisement for loans. In light of the present disclosure, it will be appreciated that messages 320 and 321 may also comprise unrelated advertisements. For example, message 320 may comprise an advertisement for cars, while message 321 may comprise an advertisement for books. Message 321 may provide a back button 326 to allow the end-user to go back to message 320. That is, clicking on back button 326 will redisplay message 320 in the presentation vehicle. Generally, depending on implementation, presentation vehicle 200 (i.e., 200, 200-1, . . . ) may include both forward and back buttons to allow an end-user to scroll through multiple messages, such as more than 2 advertisements.

Figure 4:
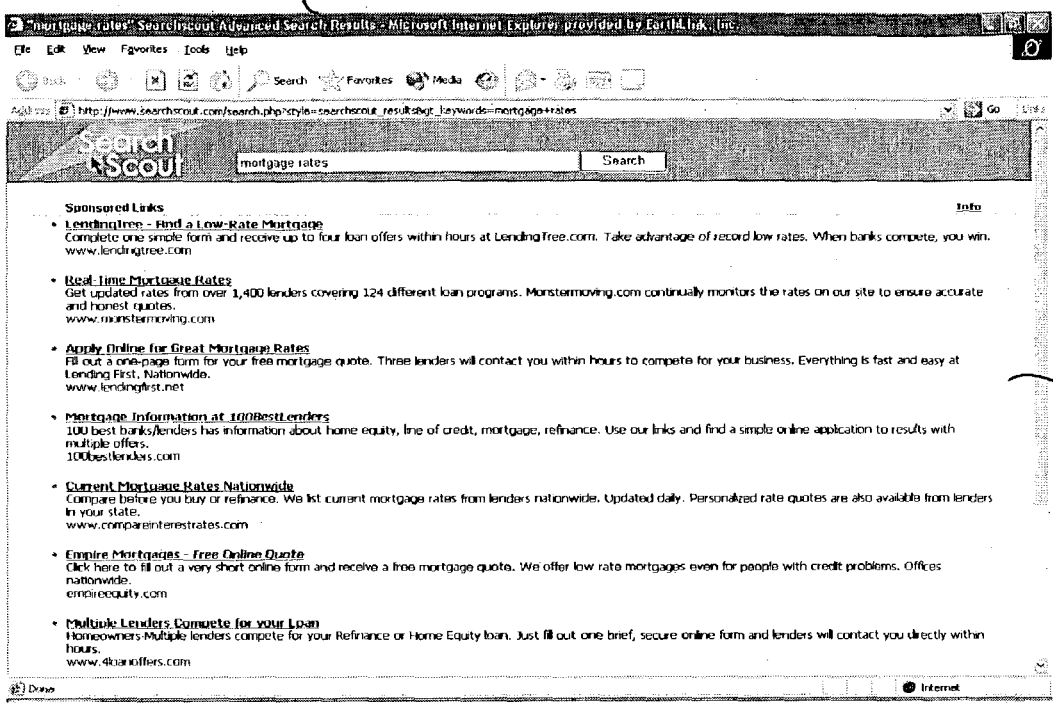
FIGS. 4 and 5 show search results in accordance with an embodiment of the present invention.

Also in the example of FIG. 3(c), message 321 provides a user interface for performing an Internet search. For example, entering the keywords "mortgage rates" and clicking on search button 324 may open another window containing search results for the aforementioned keywords. An example search results is shown in FIG. 4 as search results 401 displayed in browser window 402. Search results 401 comprise a listing of links to web sites relating to "mortgage rates." Each of the links in search results 401 may be a paid advertisement, for example.

Search results 401 may be served by a search engine (not shown) over the Internet. The keywords "mortgage rates" may be passed to the search engine, which then performs a search using the keywords. The resulting search results may then be posted on a designated web page, where browser window 402 is pointed to. Note that generation of search results on the Internet, in general, is known in the art. Example techniques for generating search results are also described in commonly-assigned U.S. application Ser. No. 10/289,123, entitled "Responding To End-User Request For Information In A Computer Network," filed on Nov. 5, 2002 by Eugene A. Veteska, David L. Goulden, and Anthony G. Martin, which is incorporated herein by reference in its entirety.

Figure 5:
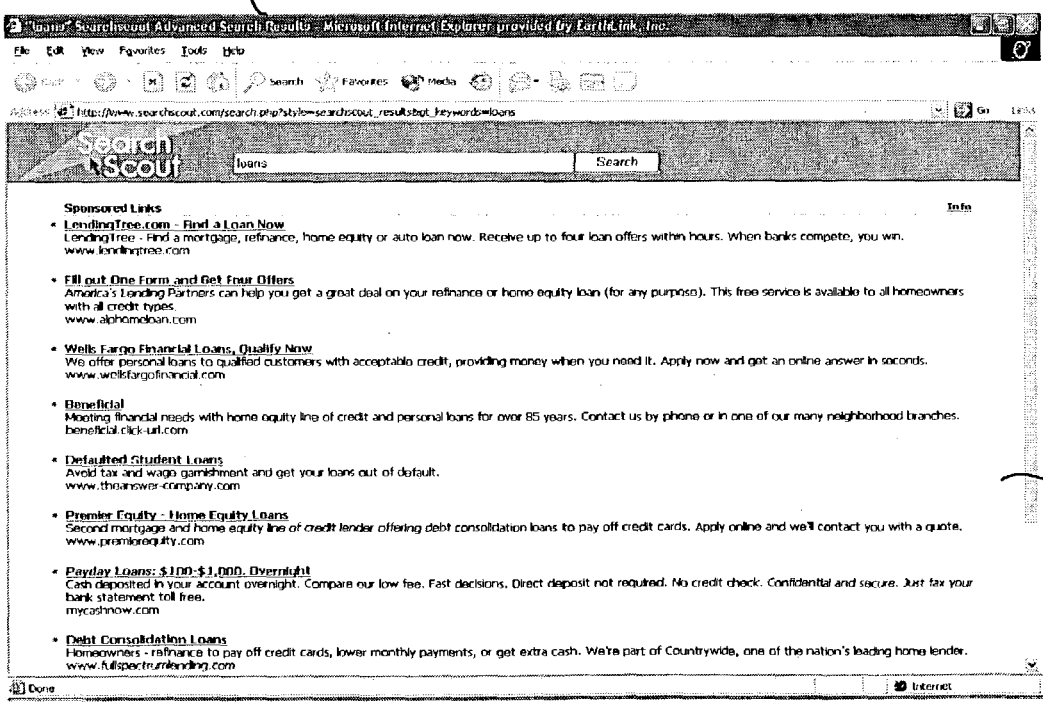

In the example of FIG. 3(c), message 321 also provides the end-user an option to run a pre-configured search. A pre-configured search performs a search using a predetermined keyword not entered by the end-user. For example, clicking on link 322 may result in an Internet search for the keyword "loans." An example pre-configured search results is shown in FIG. 5 as search results 501 displayed in a browser window 502.

Figure 6:
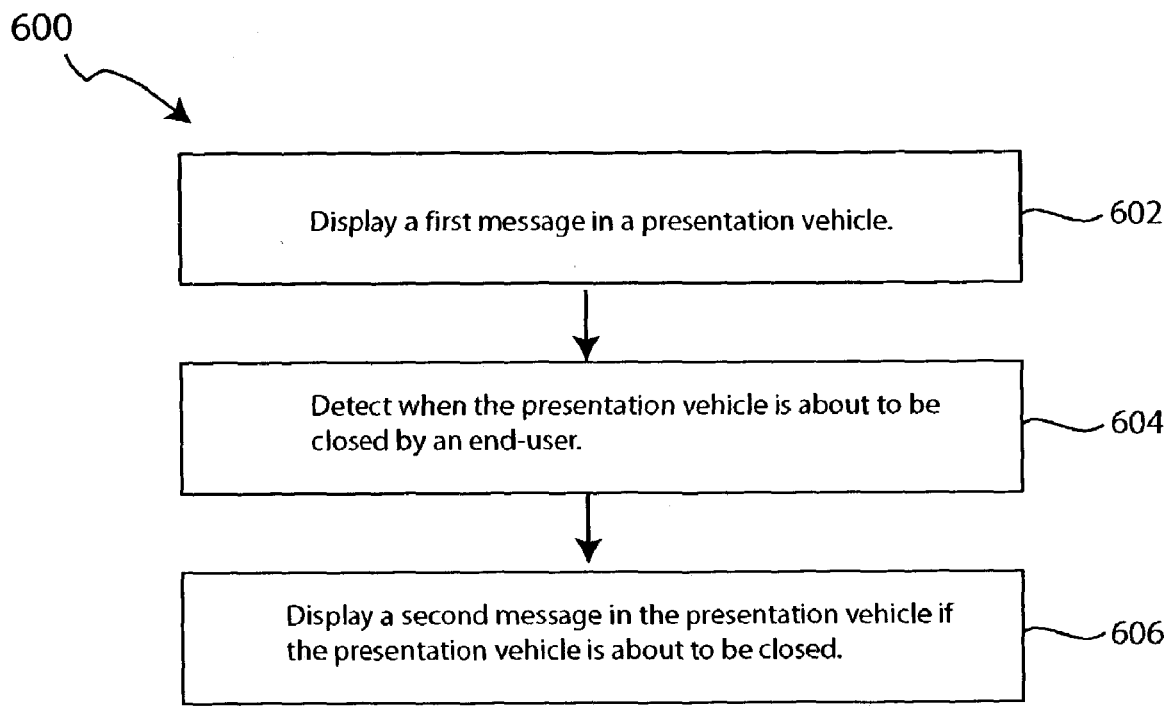
FIG. 6 shows a method for presenting messages to an end-user in accordance with an embodiment of the present invention.

Referring now to FIG. 6, there is shown a method 600 for presenting messages to an end-user in accordance with an embodiment of the present invention. Method 600 may be implemented as computer-readable program code running in a client computer. For example, method 600, may be stored in a computer-readable storage medium, such as a disk drive, and then loaded into memory for execution by a microprocessor.

Beginning in step 602, a first message is displayed in a presentation vehicle. The first message may be an advertisement and the presentation vehicle may be a window, for example. The window displaying the first message may be a window separate from a browser window, or integrated with a web page displayed in a browser window.

In step 604, an act by an end-user indicative of a desire to close the presentation vehicle is detected. Step 604 may be performed by detecting for the presence of a cursor over a close button, for example.

In step 606, a second message is displayed in the presentation vehicle if the presentation vehicle is about to be closed. The second message may be an advertisement. The advertisement of the second message may or may not be related to that of the first message (e.g., advertisements for different products), and the advertisements may or may not be from the same company. As can be appreciated, displaying the second message in the same presentation vehicle used to display the first message minimizes the amount of advertising windows in a computer screen, and also provides a second chance to attract an end-user's attention.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of presenting messages to an end-user in a computer network, the method comprising:
displaying a first advertisement in a particular pop-up window;
detecting when an end-user places a cursor over a close button of the particular pop-up window; and
in response to detecting the cursor over the close button, sequentially displaying a second advertisement in the particular pop-up window before the end-user clicks on the close button.

2. The method of claim 1 wherein the second advertisement comprises an interface for performing a search.

3. The method of claim 1 wherein the computer network includes an Internet.

4. The method of claim 1 wherein the cursor comprises a cursor of a pointing device.

5. The method of claim 4 wherein the pointing device comprises a mouse.

6. A method of presenting messages to an end-user in a computer network, the method comprising:
displaying a first advertisement in a particular pop-up window; and
sequentially displaying a second advertisement in the particular pop-up window in response to detection of an end-user placing a cursor over a close button of the particular pop-up window but before the end-user clicks the close button.

7. The method of claim 6 wherein the computer network comprises an Internet.

8. The method of claim 6 wherein the second advertisement comprises an interface for performing a search.

9. The method of claim 6 wherein the second advertisement replaces the first advertisement in the particular pop-up window.

10. A client computer for presenting messages to an end-user in a computer network, the client computer having memory comprising:
computer-readable program code for displaying a first advertisement in a particular pop-up window;
computer-readable program code for detecting when an end-user places a cursor over a close button of the particular pop-up window; and
computer-readable program code for sequentially displaying a second advertisement in the particular pop-up window in response to detecting the cursor over the close button but before the end-user clicks the close button.

11. The client computer of claim 10 wherein the particular pop-up window comprises an advertising window delivered over an Internet.

12. The client computer of claim 10 wherein the second advertisement comprises an interface for performing a search.

13. A system for presenting messages to an end-user, the system comprising:
a server computer configured to deliver a first advertisement and a second advertisement to a client computer; and
a client computer configured to display the first advertisement in a particular pop-up window, the client computer further configured to sequentially replace the first advertisement with the second advertisement in the particular pop-up window upon detection of a cursor over a close button of the particular pop-up window, the second advertisement being displayed in the particular pop-up window before the end-user clicks the close button.

14. The system of claim 13 wherein the particular pop-up window comprises an advertising window.

15. The system of claim 13 wherein the first advertisement is delivered over an Internet.

16. The system of claim 13 wherein the second advertisement comprises an interface for performing a search.

17. The system of claim 13 wherein the second advertisement comprises a product advertisement.

* * * * *